Dec. 21, 1965     W. HAMILTON     3,224,491
HATCH COVER SYSTEM

Filed June 21, 1963     12 Sheets-Sheet 1

INVENTOR.
WALLACE HAMILTON
BY
[signature] Stephen M. Mihaly
ATTORNEY

INVENTOR.
WALLACE HAMILTON

Dec. 21, 1965   W. HAMILTON   3,224,491
HATCH COVER SYSTEM

Filed June 21, 1963   12 Sheets-Sheet 5

INVENTOR.
WALLACE HAMILTON
BY
ATTORNEY

Dec. 21, 1965  W. HAMILTON  3,224,491
HATCH COVER SYSTEM
Filed June 21, 1963  12 Sheets-Sheet 6

INVENTOR.
WALLACE HAMILTON
BY
ATTORNEY

Dec. 21, 1965 W. HAMILTON 3,224,491
HATCH COVER SYSTEM
Filed June 21, 1963 12 Sheets-Sheet 7

INVENTOR.
WALLACE HAMILTON
BY
ATTORNEY

Dec. 21, 1965    W. HAMILTON    3,224,491
HATCH COVER SYSTEM
Filed June 21, 1963    12 Sheets-Sheet 9

INVENTOR.
WALLACE HAMILTON
BY
ATTORNEY

INVENTOR.
WALLACE HAMILTON

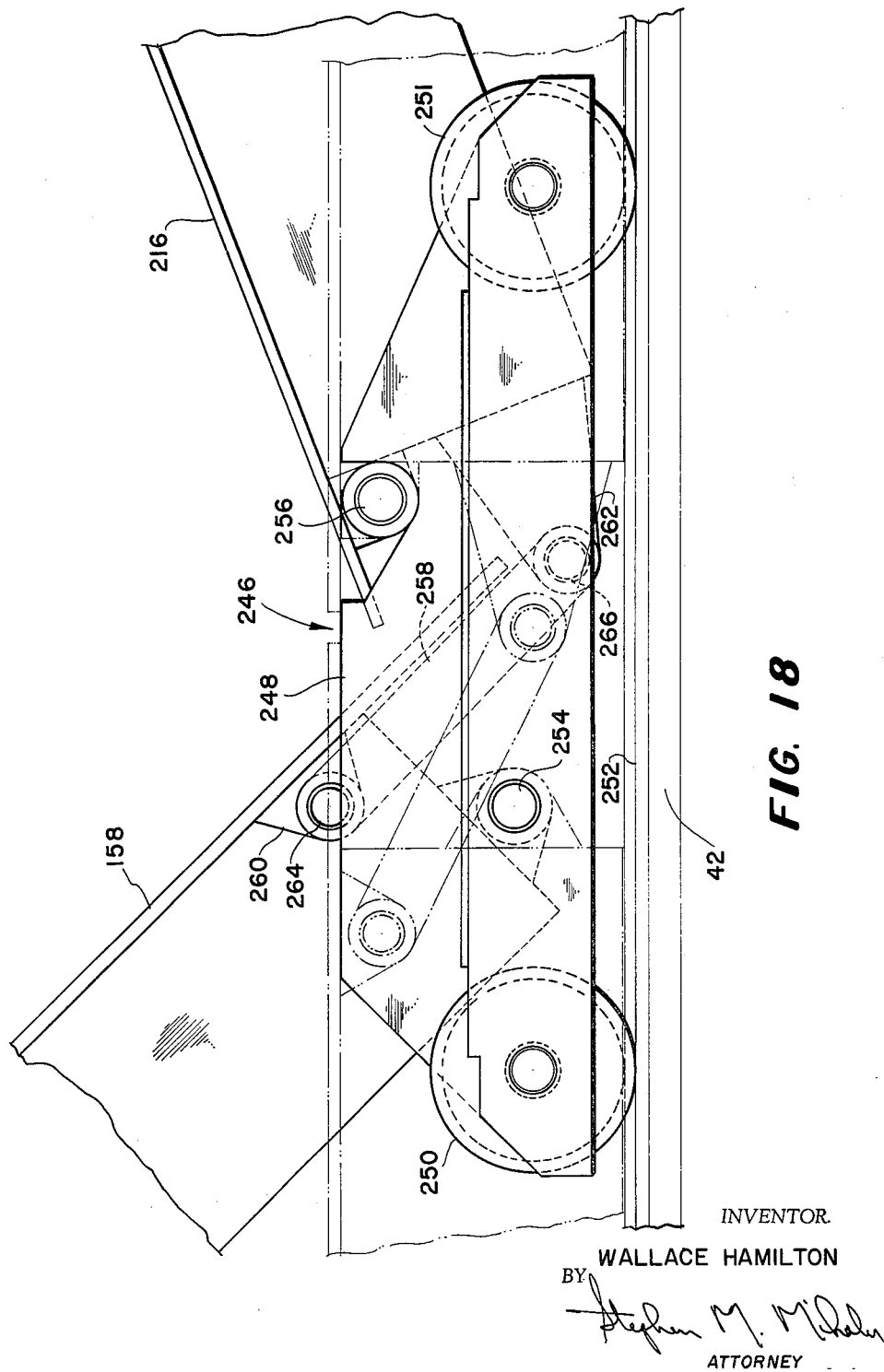

United States Patent Office 3,224,491
Patented Dec. 21, 1965

3,224,491
HATCH COVER SYSTEM
Wallace Hamilton, Bentleyville, Ohio, assignor to PneumoDynamics Corporation, Cleveland, Ohio, a corporation of Delaware
Filed June 21, 1963, Ser. No. 289,674
12 Claims. (Cl. 160—188)

The instant application is a continuation-in-part of my application Serial No. 228,292 filed October 4, 1962 and the entire disclosure of that application is hereby incorporated by reference to the extent that it is not inconsistent with the present disclosure.

This invention relates to power operated hatch cover systems for opening and closing hatchways provided in wagons, railroad cars or in the decks of vessels, such as ships or the like, and more particularly pertains to a new and improved hatch cover system and apparatus for collapsing and extending the panels of the hatch cover in opening and closing such hatchways.

To date, various systems and arrangements of hatch covers and apparatus for actuating same have been developed to improve the manipulation of the covers from an open to a closed hatchway position and vice versa. Such apparatus encompasses mechanical as well as hydraulic actuating apparatus involving complex and expensive units substantially increasing the costs of providing suitable covers for hatchways to protect cargo carried by the vessel. In instances where mechanically actuated hatch covers have been employed, the systems for opening and closing the hatchways have included complex linkage arrangements as well as apparatus, although simple in nature, requiring large forces to actuate the covers. Where vessels have been employed to carry cargo, such as grain or the like, hydraulic hatch covers have often damaged valuable cargo through leaks or breakage in the actuating apparatus of the covers resulting in oil spillage on the cargo itself. Further, the use of hydraulically actuated apparatus for manipulating the hatch covers has proved to be costly in installation as well as maintenance, since repair work requires competent personnel throughly familiar with the operation of the hatch cover system. The expense involved in repairs often becomes acute in instances where the vessels are in foreign ports lacking in qualified personnel to perform the needed repair work.

With the need for an improved design hatch cover system readily apparent from the problems encountered by the prior art systems the invention, described herein, is provided which obviates these problems and, accordingly, the objects of the invention are as follows.

It is an object of this invention to provide a new and improved power operated hatch cover system and actuating apparatus therefor, wherein a novel cable and pulley assembly comprises the actuating apparatus.

It is another object of this invention to provide a new and improved power operated hatch cover system and actuating apparatus therefor, wherein the novel pulley and cable assembly is operable in odd and even numbered panel arrangements of hatch covers.

It is a further object of the invention to provide a new and improved power operated hatch cover system and actuating apparatus therefor, wherein the novel pulley and cable assembly comprises a multiplicity of pulleys and a single cable operable to actuate a single or a series of panels forming the hatch cover arrangement.

A still further object of this invention is to provide a new and improved power operated hatch cover system and actuating apparatus therefor whereby a standard source of power utilized by vessels can be employed to operate the apparatus eliminating the need for large operator control stations occupying valuable weather-deck space.

It is another object of this invention to provide a new and improved power operated hatch cover system and actuating apparatus therefor, whereby the power source for operating the panels to the folded and extended positions is mounted on one of the panels providing a self-contained unitary system.

It is still another object of this invention to provide a new and improved power operated hatch cover system and actuating apparatus therefor, wherein the power source is an electrically operated winch mechanism mounted on one of the panels beneath the top surface thereof being responsive to an on-off switch remote from the panels.

It is a further object of this invention to provide a new and improved power operated hatch cover system and actuating apparatus therefor, wherein the system includes a safety device operable to restrict the operation of the winch mechanism responsive to obstructions in the path of movement of the panels thereby preventing the opening and closing of the hatchway until such obstructions are removed.

It is still a further object of this invention to provide a new and improved power operated hatch cover system and actuating apparatus therefor, wherein a safety device is provided mounted on one of the panels responsive to an electrical signal source similarly servicing the mechanism for controlling the actuating cable thus providing a unitary power source, panel actuating and safety device system arrangement.

It is another object of this invention to provide a new and improved power operated hatch cover system and actuating apparatus therefor, including a novel trucking and connecting link arrangement utilized between adjacent pairs of panels in an even numbered assembly or between one panel of a pair of panels and the adjacent panel thereto in an odd numbered panel assembly operative as a force transmitting means responsive to the actuation of the panels whereby the arrangement is capable of functioning as the odd panel actuating means or as a means of supplying additional lifting force to adjacent pairs of panels upon panel actuation movement.

It is another further object of this invention to provide a new and improved power operated hatch cover system and actuating apparatus therefor, wherein the novel apparatus is simple in design, fast and efficient in operation and involves inexpensive installation in new as well as existing hatch cover panel arrangements on vessels.

These and other objects and important features of the invention will be apparent from a study of the specification following taken with the drawing which together show, illustrate, describe and disclose the preferred embodiment or modification of the invention and what is now considered to be the best mode of practicing the principles thereof. Still other embodiments or modifications of the invention may be suggested to those having the benefit of the teaching herein, and all such embodiments or modifications are intended to be reserved as they fall within the spirit and scope of the subjoined claims.

In the drawing:

FIGURE 18 is a side elevational view partly a cross-section of a novel truck and panel arrangement utilized in multiple panel hatch cover arrangements illustrating the truck and panels in a partially collapsed position and the panels, by dotted lines, in the extended position.

Figure 1:
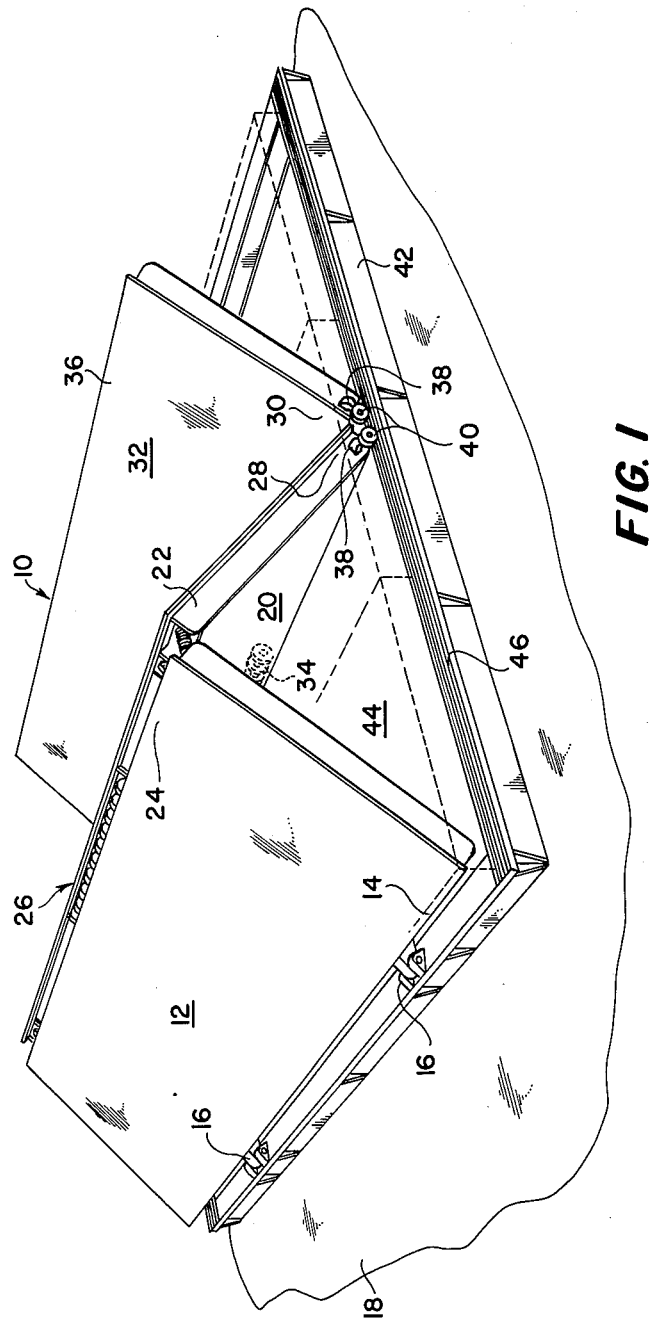
FIGURE 1 is a perspective view of a hatch cover arrangement embodying the novel panel actuating apparatus shown in a partially collapsed position.

Attention is now directed to the drawing wherein a system for opening and closing a three panel hatch cover over a ship's hatchway is illustrated wherein the hatch cover arrangement 10 comprises a first panel 12 having one end 14 thereof pivotally mounted by suitable means such as a hinge 16 to a portion of the deck 18 of the vessel (not shown). A second panel 20 is fixed at one end portion 22 thereof to one end 24 of the first panel 12 to form a pivotal connection 26 therebetween. The other end portion 28 of the second panel 20 is fixed to one end portion 30 of a third panel 32 to form a second pivotal connection 34 therebetween. The end portion 36 of the third panel 32 is free to pivot about the pivotal connection 34 in a manner to be hereinafter described. The second and third panels 20 and 32 respectively are provided with roller support arms 38 and rollers 40 journalled thereon to support the panels above the hatchway during the extending and collapsing operations of the hatch cover assembly. It is to be understood that similar arms 38 and rollers 40 are provided on both sides of the panels even though a single side of the panels is disclosed in FIGURE 1. A hatchway coaming 42, which encompasses the hatchway opening 44, is provided with a suitable track 46 to engage the rollers 40 on the support arms 38 when the hatch cover is actuated through the panel extending and collapsing operations. The coaming 42 further functions, in cooperation with the panels, to prevent the entrance of sea water or other foreign objects into the hold of the vessel when the panels are in an extended substantially horizontal position. Phantom lines of FIGURE 1 illustrate the panels in an extended substantially horizontal position when the hatchway is closed and the panels are in engagement with the coaming 42.

The pivotal connection 26 (FIGURE 2) comprises a multiplicity of pulley assemblies 48, the purpose of which will become apparent later on in the description; however, for reasons of clarity and brevity, the structural relationship of the elements in a single pulley and cable assembly is set forth. The end portion 24 of the first panel 12 is provided with a main pulley 50 rotatably mounted on a shaft 52 extending transversely in the first panel 12 and fixed thereto to form the pivotal axis of the first panel 12 for movement about the pivotal connection 26. A guide pulley 54 is rotatably mounted on a shaft 56 fixed to the end portion 24 of the first panel 12 by suitable brackets 55 and laterally disposed from the main pulley 50. The shaft 56 of the guide pulley 54 extends in a direction parallel to the shaft 52 of the main pulley 50 with the guide pulley 54 being disposed in co-planar relationship with the main pulley 50. The end portion 22 of the second panel 20 is provided with a main pulley 58 disposed in co-planar relationship with the main pulley 50 and rotatably mounted on a shaft 60 fixed to the end portion 22 of the second panel 20. The shaft 60 forms the pivotal axis of the second panel 20 for movement thereof about the pivotal connection 26. An idler pulley 62 is laterally disposed from the pulley 58 and is rotatably mounted on a shaft 64 fixed to the end portion 22 of the second panel 20 by suitable brackets 66. The shaft 64 of the idler pulley 62 is disposed in a direction normal to the shaft 60 and, accordingly, positions the idler pulley 62 in a vertical plane passed normal to the plane of the main pulleys 50 and 58. A pair of drag links 68 and 70 (FIG. 3) have one end portion 72 thereof connected to the shaft 52 and the other end portion 74 thereof connected to the shaft 60 forming a fixed connection between the first and second panels 12 and 20 respectively laterally spacing the centers of rotation of the pulleys 50 and 58 and the corresponding pivotal axes of the panels 12 and 20 respectively about the pivotal connection 26. Each of the pulleys is provided with suitable grooves to receive a cable 76 therein threaded about the pulleys 54, 50, 58 and 62 in the manner illustrated in FIGURE 2 wherein one end portion 78 of the cable 76 is suitably fixed to a power source (not shown) such as a winch or the like operable upon actuation to produce a tensile load on the cable to pull the cable in the direction shown in FIGURE 2.

Figure 3:
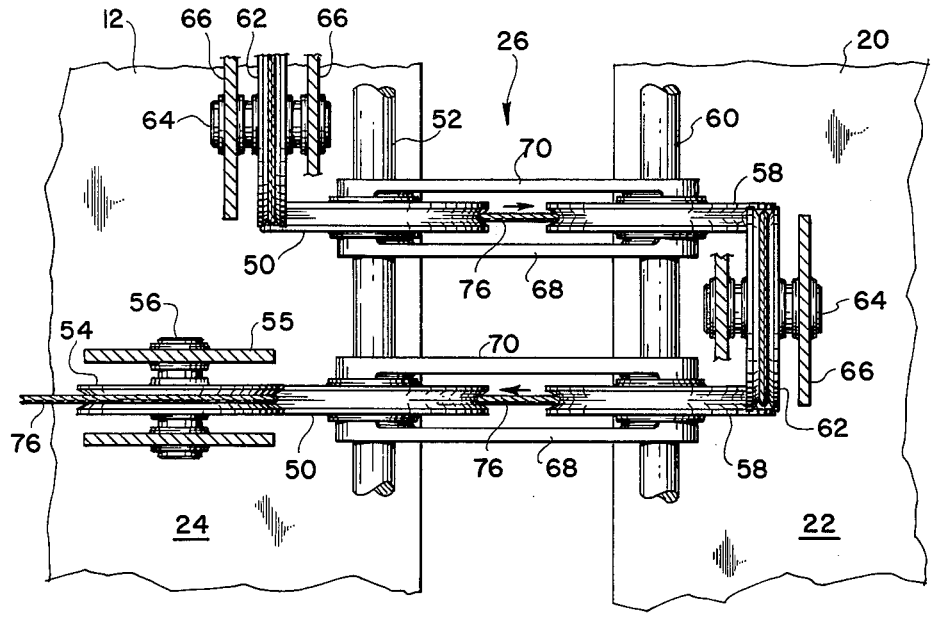
FIGURE 3 is an enlarged top view partly in cross-section of the novel pulley and cable assembly taken along lines 3—3 of FIGURE 2.
Figure 5:
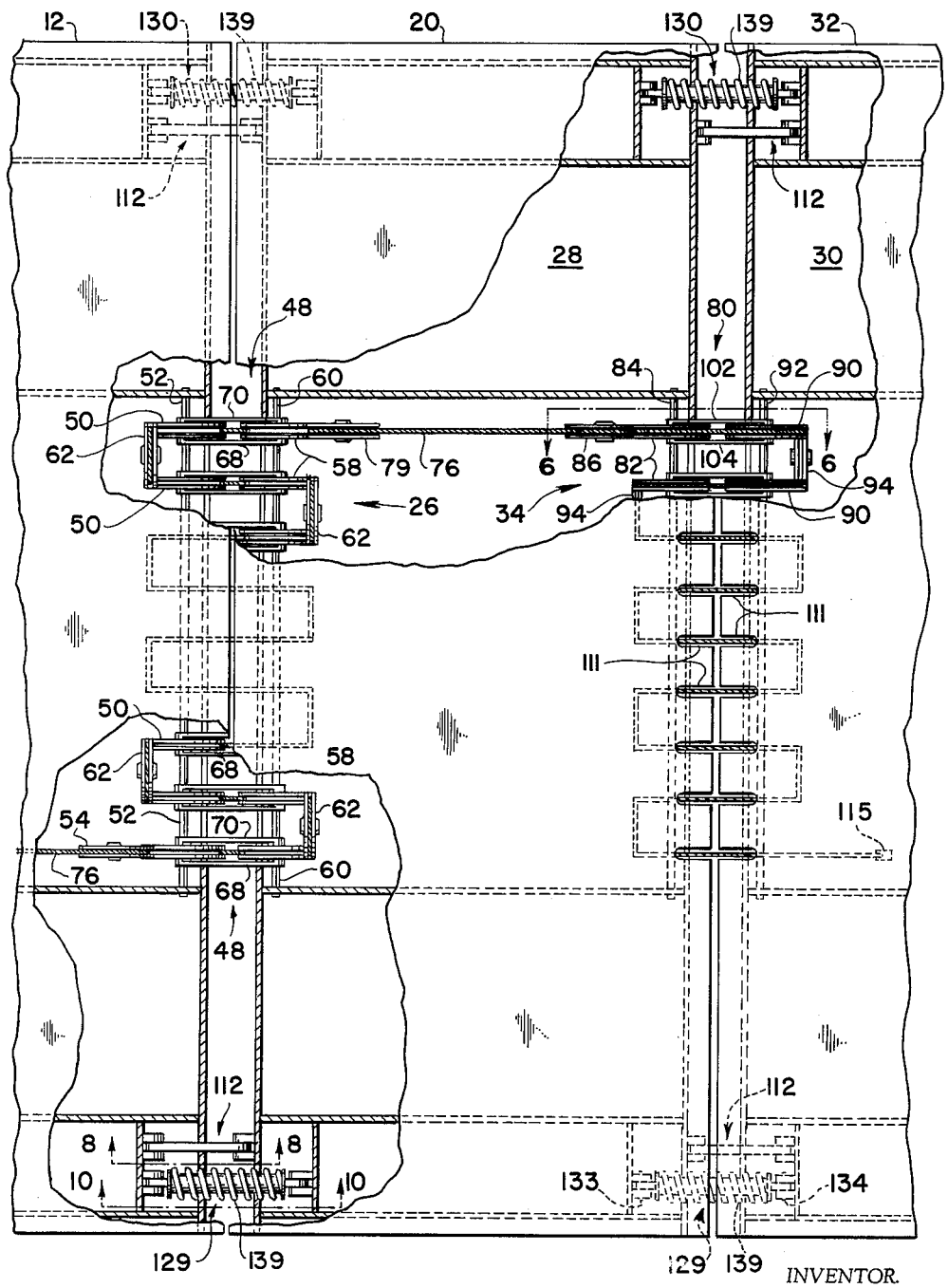
FIGURE 5 is a top view partly in cross-section of the novel pulley and cable assembly illustrating therein the structural location of the hatch cover actuating apparatus for the three panel hatch cover arrangement of FIGURE 1.

The pivotal connection 26 comprises a multiplicity of main pulleys 50 and 58 and idler pulleys 62 mounted on shafts 52, 60 and 64 respectively in a series arrangement for receiving the cable 76 thereabout in the manner illustrated in FIGURES 3 and 5. The main pulleys 50, disposed on the end portion 24 of the first panel 12, are axially spaced from one another and have a common axis of rotation coincident with the pivotal axis of the first panel 12 provided by the shaft 52. Similarly, the main pulleys 58 in the end portion 22 of the second panel 20 are axially spaced from one another along a common axis of rotation with their axes of rotation being coincident with the pivotal axis of the second panel 20 formed by the shaft 60. The idler pulleys 62 on panels 12 and 20 are laterally spaced from one another whereby their axes of rotation provided by the shafts 64 are disposed parallel to one another. The idler pulleys 62 are fixed to the end portions 24 and 22 of the first and second panels 12 and 20 respectively and are alternately disposed with respect to the positioning of the set of main pulleys 50 and 58 in the first and second panels 12 and 20 respectively such that the direction of movement of the cable 76 during the collapsing and opening movement of the panels is reversed in each adjacent set of main pulleys by the idler pulleys 62. A second guide pulley 79 is provided in the pivotal connection 26 (FIGURE 5) which functions to direct the cable to the adjacent pivotal connection. The specific advantage for this arrangement of the main and idler pulleys will become more apparent from a detailed description of the operation of the hatch cover arrangement set forth hereinafter.

The second pivotal connection 34 (FIGURE 6) between the second and third panels 20 and 32 respectively is similar to the pivotal connection 26 and comprises a multiplicity of pulley assemblies 80, the purpose of which will become more apparent later on in the description, however, for reasons of clarity and brevity, the structural relationship of the elements in a single pulley and cable assembly is set forth. The pulley and cable assembly 80 (FIGURE 6) comprises a main pulley 82 rotatably mounted on a shaft 84 fixed to the second panel end portion 28. The shaft 84 forms the pivotal axis of the second panel 20 for movement about the pivotal connection 34. A guide pulley 86 is laterally spaced from the main pulley 82 and rotatably mounted on a shaft 87 and fixed by suitable brackets 89 to the panel end portion 28 located below the axis of rotation of the main pulley 82 substantially adjacent the portion 88 of the second panel 20 in engagement with the coaming 42 when the hatch cover is in an extended position upon closing of the hatchway 44. The guide pulley 86 is disposed in co-planar relationship with the main pulley 82 whereby the shafts 84 and 87 are positioned parallel to one another. The end portion 30 of the third panel 32 is provided with a main pulley 90 rotatably mounted on a shaft 92 fixed to the end portion 30 of the third panel 32 wherein the main pulley 90 is laterally spaced from the main pulley 82 in the end portion 28 of the second panel 20 and disposed in co-planar relationship therewith. An idler pulley 94 is rotatably mounted about a shaft 96 fixed to the third panel 32 by suitable brackets 98 and disposed laterally below the shaft 92 at a position on the third panel 32 adjacent a portion 100 of the third panel 32 which engages the hatch coaming 42 when the panels are in an extended position upon closing of the hatchway. The shaft 92 provides the pivotal axis of the third panel 32 for movement thereof about the second pivotal connection 34. The idler pulley shaft 96 is disposed normal to the main pulley shaft 92 and correspondingly positions the idler pulley 94 in a vertical plane drawn normal to the plane of the main pulleys 82 and 90. The main pulleys 82 and 90 are situated in the second and third panels 20 and 32 respectively in the identical manner as the main pulleys 50 and 58 are disposed at the pivotal connection 26. The guide and idler pulley 86 and 94 arrangement differs from the first pivotal connection 26 in that their axes of rotation provided by the shafts 87 and 96 respectively are disposed beneath the axes of rotation of the main pulleys 82 and 90 respectively. A pair of drag links 102 and 104 (FIG. 5) are fixed at their end portions 106 and 108 to the shafts 84 and 92 respectively, to laterally fix the centers of rotation of the pulleys and the pivotal axes of the second the third panels 20 and 32 provided by the shafts 84 and 92 respectively relative to one another. The cable 76 is thus threaded through the pulleys 86, 82, 90 and 94 respectively in the manner illustrated in FIGURE 6 of the drawing. In the panel surface portions 109 and 110 at the end portions 28 and 30 of panels 20 and 32 respectively, a multiplicity of slots 111 are provided therein equal in number to the sets of main pulleys 82 and 90 utilized in the pivotal connection 34. The purpose of the slots 111 will be discussed hereinafter in the description of the operating cycle of the hatch cover assembly.

Figure 6:
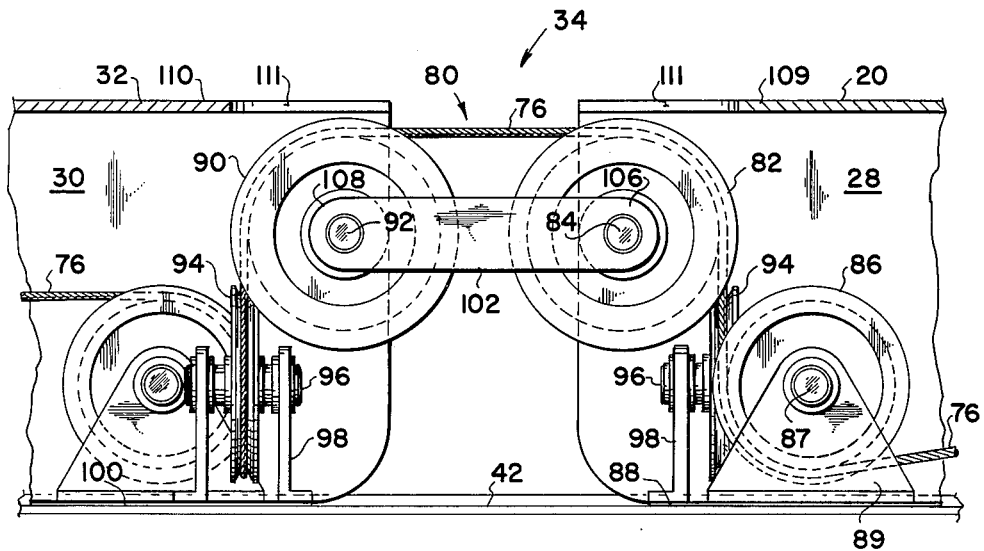
FIGURE 6 is an enlarged side elevational view, partly in cross-section of the novel pulley and cable assembly taken along lines 6—6 of FIGURE 5 illustrating the pivotal connection between the end panel and the intermediate panel of the three panel hatch cover arrangement of FIGURE 1.

The pivotal connection 34 between the second and third panels 20 and 32 respectively comprises a multiplicity of main pulleys 82 and 90 and idler pulleys 94 mounted on shafts 84, 92 and 96 respectively in a series arrangement for receiving the cable 76 thereabout in the manner illustrated in FIGURES 5 and 6. The main pulleys 82 disposed on the end portion 28 of the second panel 20 are axially spaced from one another and have a common axis of rotation co-incident with the pivotal axis of the second panel 20 provided by the shafts 84. Similarly, the main pulleys 90 in the end portion 30 of the third panel 32 are axially spaced from one another along a common axis of rotation with their axes of rotation being coincident with the pivotal axis of the third panel 32 formed by the shafts 92. The idler pulleys 94 are fixed to the end portions 28 and 30 of the second and third panels 20 and 32 respectively and are alternately disposed with respect to the positioning of the co-planar main pulleys 82 and 90 in the second and third panels 20 and 32 respectively such that the direction of movement of the cable 76 during the collapsing and opening movement of the panels is reversed in each adjacent set of main pulleys by the idler pulleys 94. The specific advantage for the multiplicity of main and idler pulleys will become more apparent from a detailed description of the operation of the hatch cover arrangement set forth hereinafter.

Figure 13:
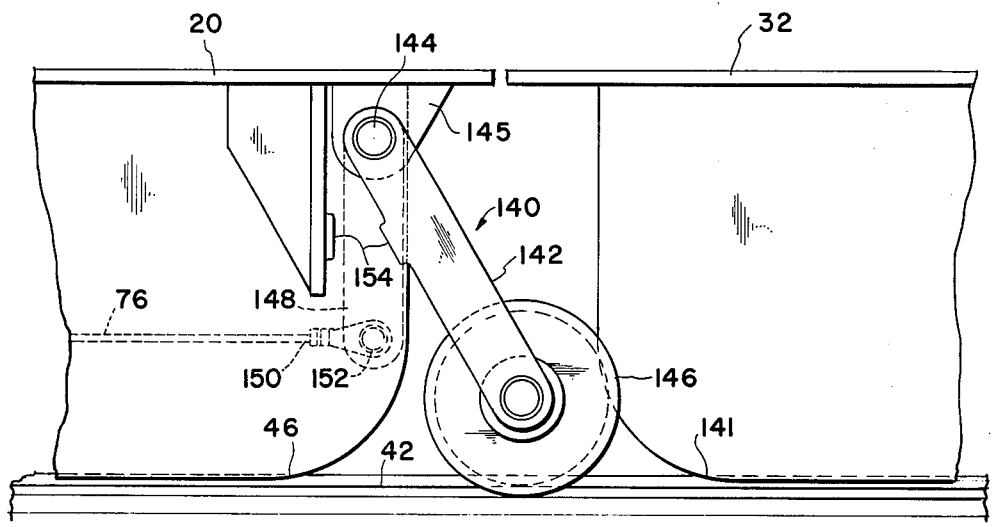
FIGURE 13 is an enlarged side elevational view, partly in cross-section of a jacking mechanism for lifting the hatch cover off of the hatchway coaming upon initial movement of the actuating apparatus.
Figure 14:
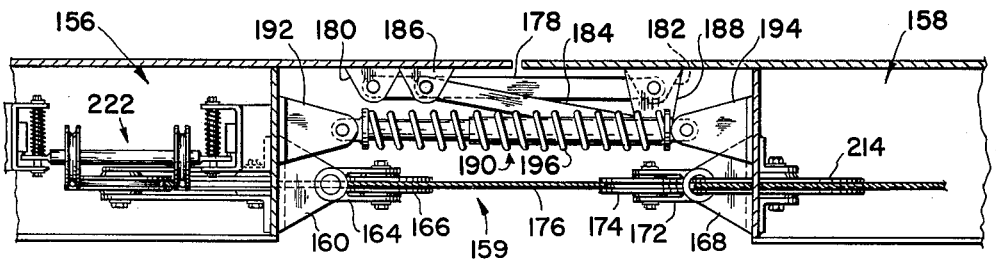
FIGURE 14 is an enlarged side elevational view partly in cross-section of a modification of the hatch cover actuating apparatus illustrated in FIGURE 2.
Figure 15:
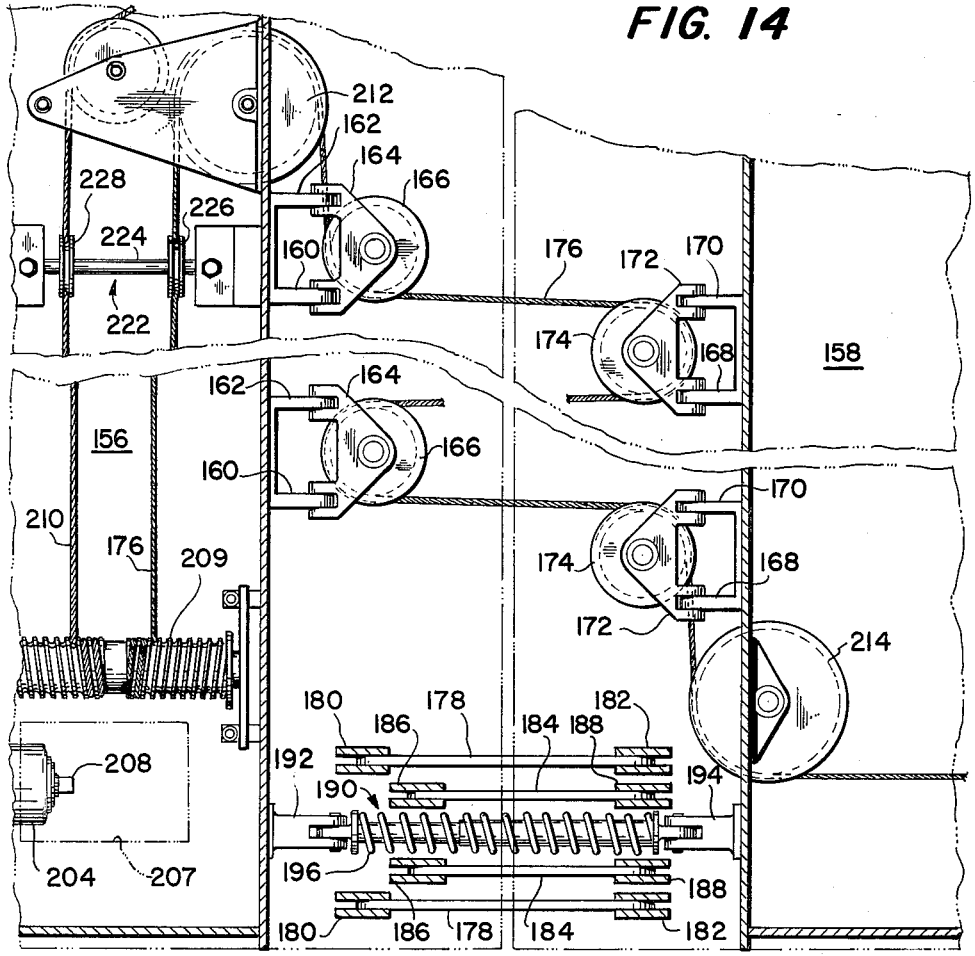
FIGURE 15 is an enlarged plan view partly in cross-section of the hatch cover actuating apparatus illustrated in FIGURE 14.
Figure 16:
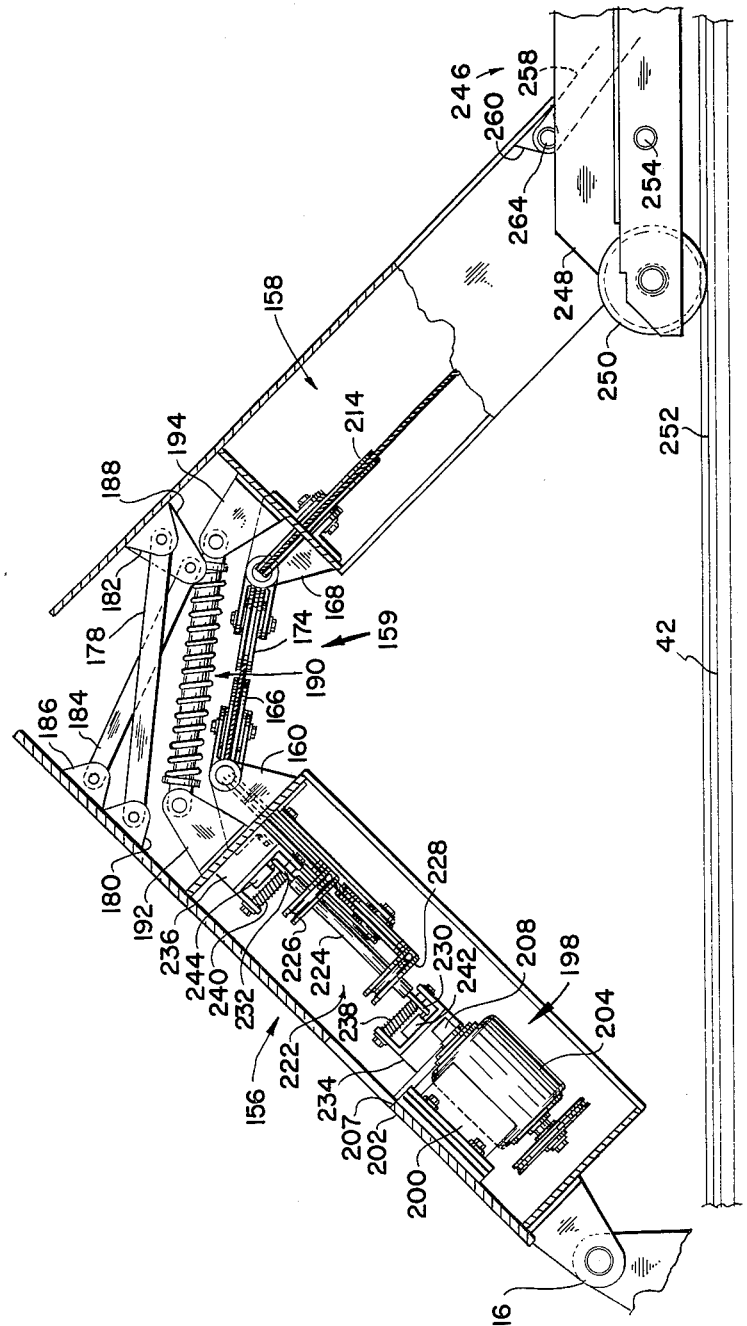
FIGURE 16 is a side elevational view partly in cross-section of the novel hatch cover actuating apparatus illustrated in FIGURE 14 showing two panels of the hatch cover arrangement in a partially collapsed position during the opening of the hatchway.

The overall arrangement of the panels in the assembly and the actuation apparatus therefore is more clearly illustrated in FIGURE 5 of the drawing, wherein the cable 76 is directed from the last pair of main pulleys of the pulley and cable assembly 48 at the pivotal connection 26 to the guide pulley 79 over to the guide pulley 86 at the pivotal connection 34 formed between the second and third panels 20 and 32 respectively. The cable 76 is then threaded through the pairs of main pulleys 82 and 90 and idler pulleys 94 in the manner illustrated in FIGURE 5 whereupon the cable can be dead ended by suitable means at a point 115 on the third panel 32 or directed to the jacking mechanism (FIGURE 13) to be discussed hereinafter in detail.

It is to be understood that the pulley and cable assembly provided at the pivotal connection 26 between a pair of panels such as the first and second panels 12 and 20 respectively, is suitable for all panel actuating pivotal connections in a hatch cover arrangement comprising even numbered or pairs of panels. The panel actuating pivotal connections between pairs of adjacent pairs of panels in an even numbered panel arrangement would be similar to the assembly illustrated in FIGURE 2 of the drawing. In any odd numbered panel arrangement of a hatch cover assembly, the pivotal connection between the end panel and adjacent panel thereto in each such arrangement will comprise a pulley and cable assembly identical with the pivotal connection 34 illustrated in FIGURE 6 of the drawing. Therefore, it can be readily seen that the number of panels required in any hatch cover assembly will have no effect in the structural arrangement of the illustrated panel actuation pivotal connections 26 and 34 between the panels.

Figure 8:
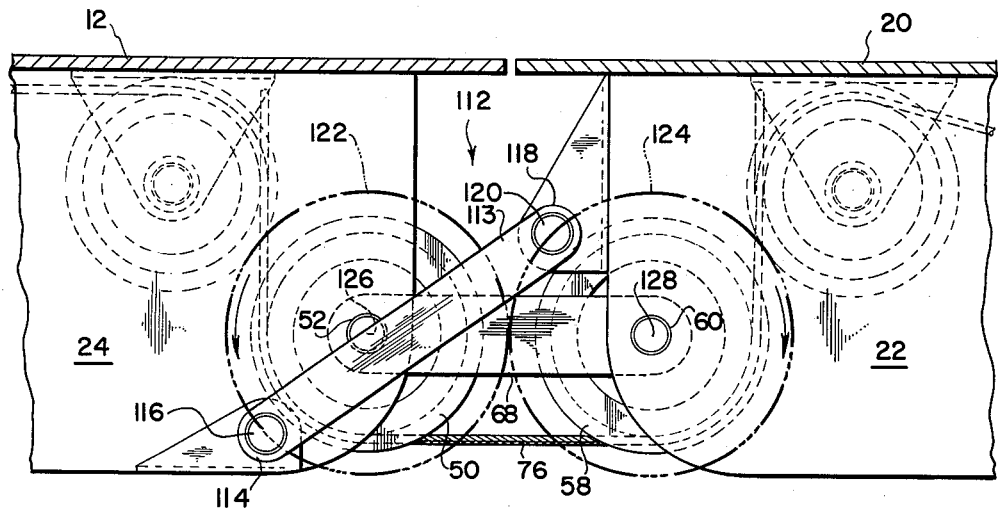
FIGURE 8 is an enlarged side elevational view partly in cross-section of the end portions of the panels taken along lines 8—8 of FIGURE 5 illustrating therein a stabilizing link utilized between adjacent panels of the hatch cover arrangement.
Figure 9:
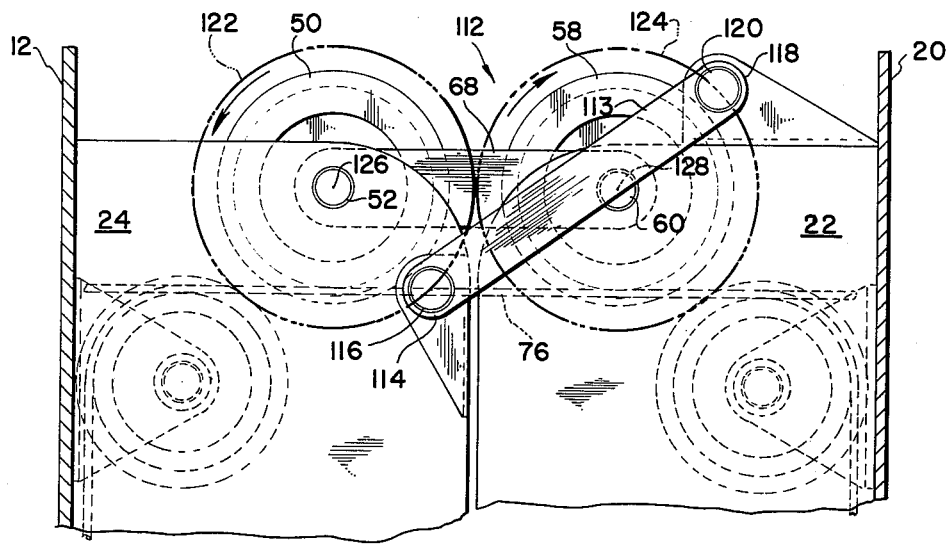
FIGURE 9 is an enlarged side elevational view, partly in cross-section, of the stabilizing linkage and panel arrangement shown in FIGURE 8 illustrating the position of a stabilizing link when the panels are in a collapsed position during the uncovering operation of the hatchway.
Figure 11:
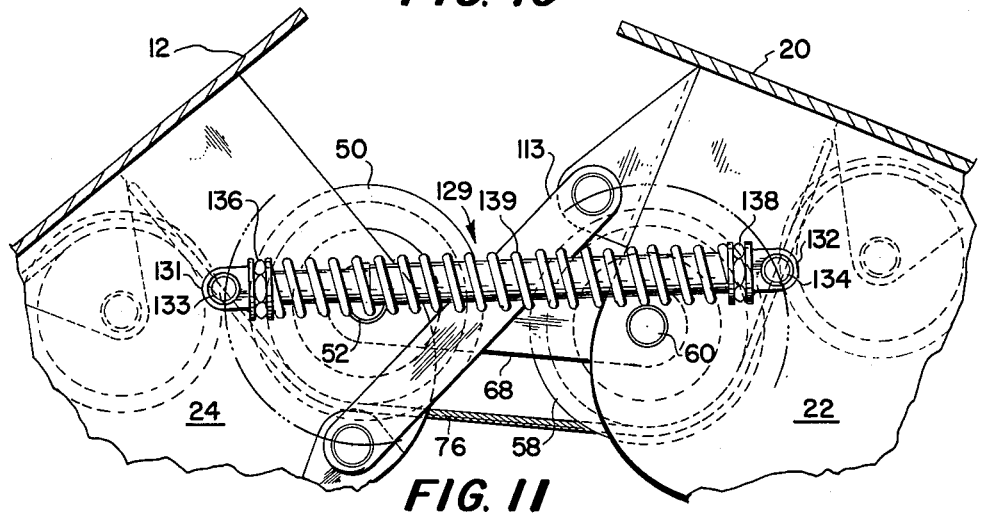
FIGURE 11 is an enlarged side elevational view partly in cross-section of the spring and panel arrangement of FIGURE 10 illustrating therein the position of the spring when the panels are in the partially collapsed position.

At the end portions between adjacent panels, stabilizing linkage 112 (FIGURE 8) is provided for preventing panel wobble and cocking motion during the collapsing and extending movement thereof as well as the completely collapsed position. The stabilizing bar 113 (FIGURES 8 and 9) is pivotally mounted at one end portion 114 thereof to a pin 116 fixed to the end portion 24 of the first panel 12 with the other end portion 118 thereof pivotally mounted on a pin 120 fixed to the end portion 22 of the second panel 20. It is to be understood that the stabilizing bar arrangement is provided between all adjacent panels in the hatch cover arrangement shown, but in hatch cover arrangements where pairs of panels are employed as in the case of odd numbered panel arrangement comprising 5, 7, or more panels as well as even numbered panels, the stabilizing bar is primarily utilized at the pivotal connection of each pair of panels. For purposes of brevity, however, the operation of a single stabilizing linkage will be described. The pins 116 and 120 fixed to the panels 12 and 20 respectively, are disposed in a predetermined spaced relationship with respect to one another in that, the pins 116 and 120 comprise points when moved in an arcuate manner define loci of points forming circles 122 and 124 (dotted lines, FIGURES 8 and 9) disposed tangent to one another and having their origins 126 and 128 respectively, at each panel pivotal axis formed by the shafts 52 and 60 respectively. During the collapsing movement of the panels (FIGURE 9) the pin 116 will rotate through an arc of the circle 122 in a counter-clockwise direction while the pin 120 rotates through an arc of the circle 124 in a clockwise direction. To permit continued collapsing movement of the panels in view of the fixed distance between the pins 116 and 120, the drag links 68 and 70 will pivot about their respective shafts 52 and 60 (FIGURE 11). This movement of the drag links occurs in reaction to the tensile load on the bar 113 created by the pivoting panels 12 and 20. Accordingly, the panels 12 and 20 collapse in a non-symmetric manner as shown in FIGURE 11. In particular, the adjacent panels 12 and 20, when in the completely collapsed position, comprise an unstable four-bar linkage arrangement capable of oscillating movement about the hinge 16 and the rollers 40 on the track 46 of the coaming 42. The disposition of the stabilizing bar in the collapsed position of the panels to form an angle with respect to the drag links 68 and 70 (FIGURE 9) thereby prevents oscillation of the panels about the hinges 16 and the rollers 40.

To aid in the panel collapsing and extending movement of the hatch cover arrangement, pairs of coil spring assemblies 129 and 150 (FIGURES 5 and 10 through 12) are provided between all adjacent panels. It is to be understood that each of the panels is provided with actuating springs disposed therebetween; however, in hatch cover arrangements where pairs of panels are employed as in the case of odd numbered panel arrangements comprising 5, 7, or more panels as well as even numbered panels, the pairs of coil springs are primarily utilized at the panel actuating pivotal connection of each pair of panels. For the purpose of brevity, the operation of a single spring assembly 129 will be discussed hereinafter in detail. The end portions 131 and 132 of the spring assembly 129 are fixed to the end portions 24 and 22 of the adjacent panels 12 and 20 respectively by securing pins 133 and 134 respectively. Adjusting mechanisms 136 and 138 are provided at the end portions 131 and 132 respectively of a coil spring 139 to facilitate preloading of the spring to a predetermined amount. In the panel extended position (FIGURE 10) the securing pins 133 and 134 on the panels 12 and 20 respectively, are in substantial axial alignment with respect to one another parallel to a horizontal plane defined by the hatch cover panels and laterally disposed above the panel pivotal axes provided by the shafts 52 and 60. During the collapsing movement of the panels, the securing pins 133 and 134 rotate in opposite directions defining arcs having the origin of their radi of curvature at the shafts 52 and 60 respectively disposing the spring 139 in an extended position whereby the preloading thereof is substantially reduced (FIGURE 11). At the completely collapsed position (FIGURE 12) of the panels, the securing points 133 and 134 are located below the shafts 52 and 60, and such movement of the panels compresses the coil spring 137 to reload same.

Figure 10:
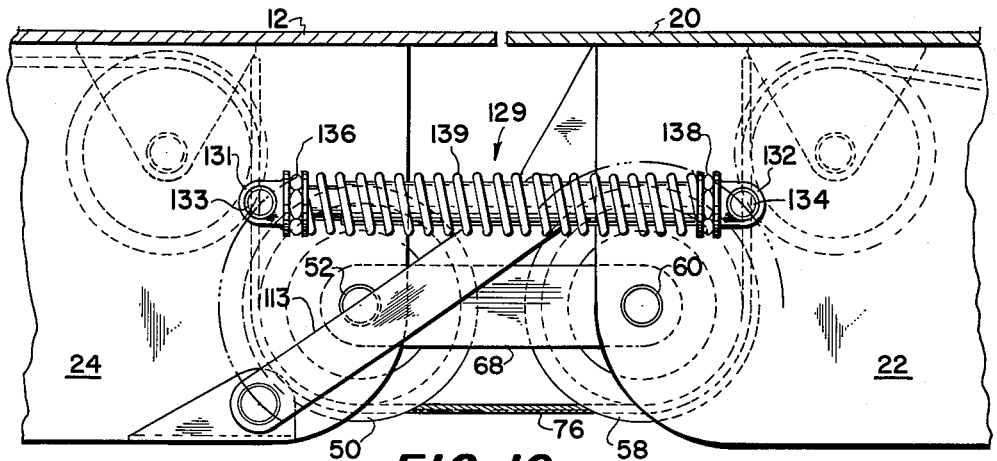
FIGURE 10 is an enlarged side elevational view, partly in cross-section, of the end portions of adjacent panels in the hatch cover arrangement taken along lines 10—10 of FIGURE 5 illustrating therein a spring and panel arrangement utilized to supplement the hatch cover actuating apparatus during the initial extending and collapsing operation of the panels in the hatch cover arrangement.
Figure 12:
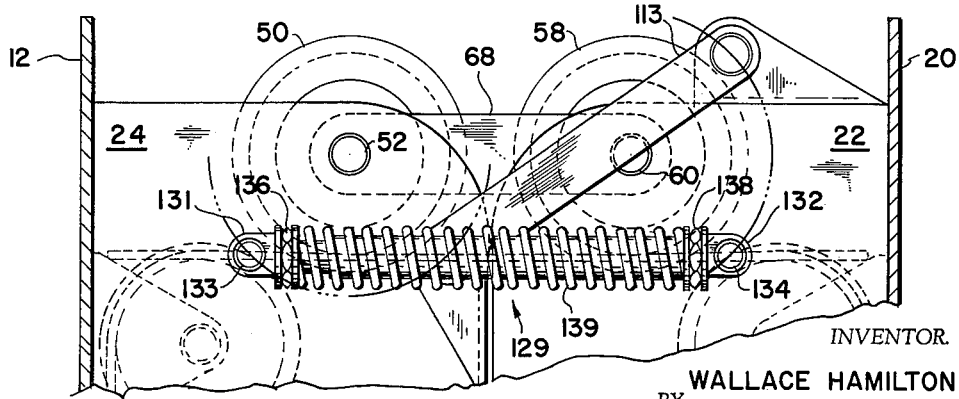
FIGURE 12 is an enlarged side elevational view of the spring and panel arrangement of FIGURE 10, illustrating therein the disposition of the spring with respect to the panels when the panels are in the completely collapsed position.

Between the second and third panels 20 and 32, the coil springs 139 (FIGURE 5) have their end portions secured to suitable pins 133 and 134 which are disposed below the shafts 82 and 90 in the pivotal connection 34 when the panels 20 and 32 are in the extended position. The manner of operation of the springs secured to panels 20 and 32 during the collapsing movement of the panels is similar to the spring operation between panels 12 and 20 hereinabove set forth; however, the sequence in movement of the springs as illustrated in FIGURES 10, 11, and 12 from the panel extended to the collapsed position is reversed. The loading and unloading of the springs 139 produced by the movement of the panels, is operable to provide additional lifting forces during the initial collapsing movement of the covers and aids in the initial extending movement of the panels during the hatchway closing operation of the hatch covers. It can be readily seen that the amount of preloading in the coil spring 139 is dependent upon the particular location of the spring ends on the panels with respect to the disposition of the panels when in the collapsed and extended positions. In hatch cover arrangements where the number of panels are large, the collapsing and extending movements result in some panels collapsing prematurely or at a slow rate causing excessive delay in the manipulation of the cover. The coil spring can be effectively utilized to control the sequence of movement of the panels by varying the preloading thereof and selectively disposing the end portions of the spring about the respective pivotal axes of the adjacent panels in the pivotal connection.

In hatch cover systems where a seal is provided for engagement with the coaming, a mechanism is desirable which will, upon actuation, lift the assembly from the coaming in a manner to prevent the occurrence of damage to the seal. Where a seal 141 is provided and is attached to the hatch cover assembly (FIGURE 13), collapsing and extending movement of the panels generally results in damage to the seal, substantially reducing its life expectancy. To obviate the occurrence of this damage, a pair of jacking mechanisms 140 (one shown) are provided in the hatch cover system comprising support arms 142 located externally of the panel 20 and fixed to a laterally extending shaft 144 disposed in the second panel 20. The shaft 144 is secured to panel 20 by suitable brackets 145. The support arms 142 have support rollers 146 journalled thereon engaging the track 46 on the coaming 42. A bar 148 is fixed to the shaft 144 and is disposed on the shaft intermediate the support arms 142. The cable 76 extending from the pivotal connection 34, in the absence of dead ending same to the third panel 32, is fixed at its end portion 150 to the bar 148 at point 152. Tension applied to the cable 76 at the initial collapsing movement of the hatchway opening will pivot the bar 148 about the shaft 144 developing a moment about the shaft 144 causing the support arms 142 to pivot downward about the axis of the shaft 144. This movement of the support arms 142 results in the engagement of the rollers 146 with the track 46. As the cable tension is increased, the net result of the downward force applied to the support arms 142 and in turn the support rollers 146 causes the pivotal connection 34 to move upwardly and pivot the end portions 28 and 30 of panels 20 and 32 respectively about the hinge 16 between the deck 18 and the first panel 12. The amount of upward movement of the panels is controlled by stops 154 to prevent damage to the panels. In providing a suitable jacking mechanism, the amount of cable pull to pivot the arms 142 is designed to be less than the pull necessary to raise the respective panels and, accordingly, the panels will be lifted from the coaming before the pivotal connections are actuated.

Figure 7:
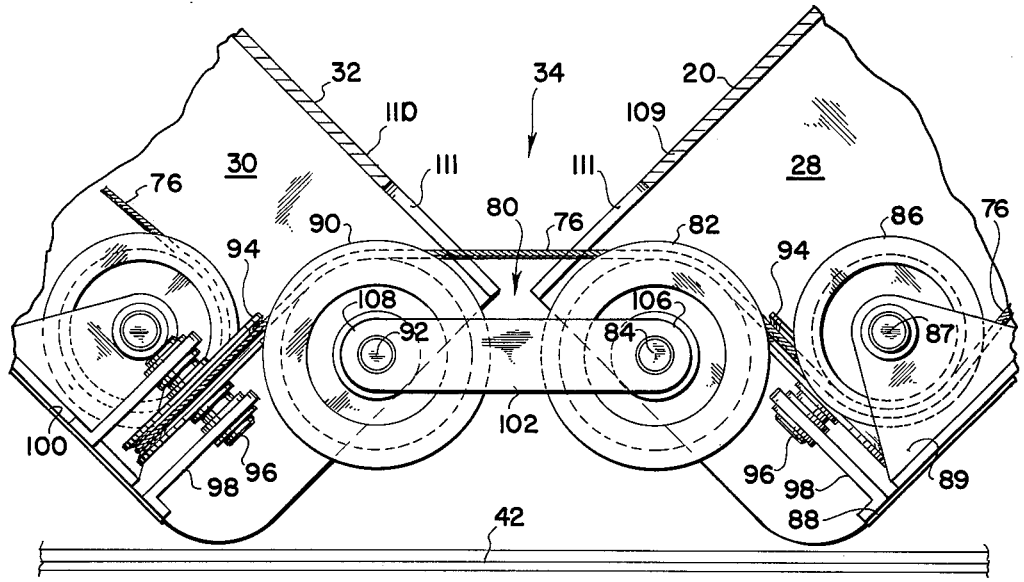
FIGURE 7 is an enlarged side elevational view, partly in cross-section, of the novel pulley and cable assembly illustrating therein the end panel and the intermediate panel arrangement of FIGURE 6 in a partially collapsed position occurring during opening of the hatchway.

In order to more fully and completely understand the novel concept disclosed herein, a typical operating cycle of the hatch cover system will be described in detail. When the hatch cover assembly 10 is in an extended position and opening of the hatchway is desired, tension is applied to the cable 76 by the power source (not shown) causing the following reaction: At the pivotal connection 26, the main pulleys 50 and 58 rotate in the direction indicated (FIGURE 4) through an arc of 90° developing moments about the shafts 52 and 60 respectively. These moments developed about the shafts 52 and 60 and in turn the hinge point of the adjacent panels which is coplanar with their pivot points can be computed by the amount of tension in the cable times the radius of the pulleys 50 and 58. The hinge point of adjacent panels is determined by the intersection of the planes of the stabilizer bar and drag links and in the instant embodiment moves along the drag link length responsive to the pivotal movement of the panels. Accordingly then, the moment arm length is equal to the radius of the pulleys 50, 58, 82 and 90, since the axis of rotation of the pulleys is coplanar with the hinge point of the adjacent panels. Since panel 12 is hinged at point 16, the torque developed by the cable and main pulleys 50 and 58 about the hinge point and reacted to by the panels at the engagement thereof with the coaming causes the panels at the pivotal connections 26 between the panels 12 and 20 to lift upwardly and begin pivoting about their respective shafts 52 and 60. Simultaneously, with the upward movement of the pivotal connection 26, the main pulleys 82 and 90 in the pivotal connection 34 rotate through a 90° arc in the direction shown in FIGURE 7 developing moments thereabout equal to the radius of the pulleys times the cable tension force and reacting on the drag links 102 and 104 respectively. Since the end portion 30 of the third panel 32 is free, the reaction of the drag links 102 and 104 to the torque developed by the main pulleys 90 results in the pivoting of the third panel about the pivotal axis provided by the shaft 92. Due to the arrangement of the main pulleys 82 and 90 with respect to the end portions 28 and 30 of panels 20 and 32 respectively, the panel collapsing movement causes the panels to pivot about their respective shafts 84 and 92 whereby the cable 76 is received in the slots 111 formed in the panel surface portions 109 and 110. The slots 111 therefore are provided to eliminate contact of the panels with the cable 76 in the manner illustrated in FIGURE 7. The combined pivotal movement of the panels results in the collapsing of the panels in the manner illustrated in FIGURES 4 and 7. When closing of the hatchway is desired, the tension in the cable 76 is released allowing the springs 139 to expand to initiate the extending movement of the panels and permit gravity to return the covers through the reversal of the direction of rotation of the main pulleys at the pivotal connections 26 and 34 and through the rolling engagement of the support rollers 40 with the track 46 to the horizontally disposed position. The tension in the cable 76 is gradually released so that the return of the panels is accomplished in a manner preventing damage to the cover which would occur if the cable tension was released in its entirety.

Along with the torque developed by the cable and main pulleys at the pivotal connection, additional lifting forces are provided in the form of force couples between the guide and main pulleys and the idler and main pulleys at each panel end portion. The particular magnitude of these forces at given conditions can be readily computed by one skilled in the art upon an analysis of the cable and pulley assembly.

Figure 4:
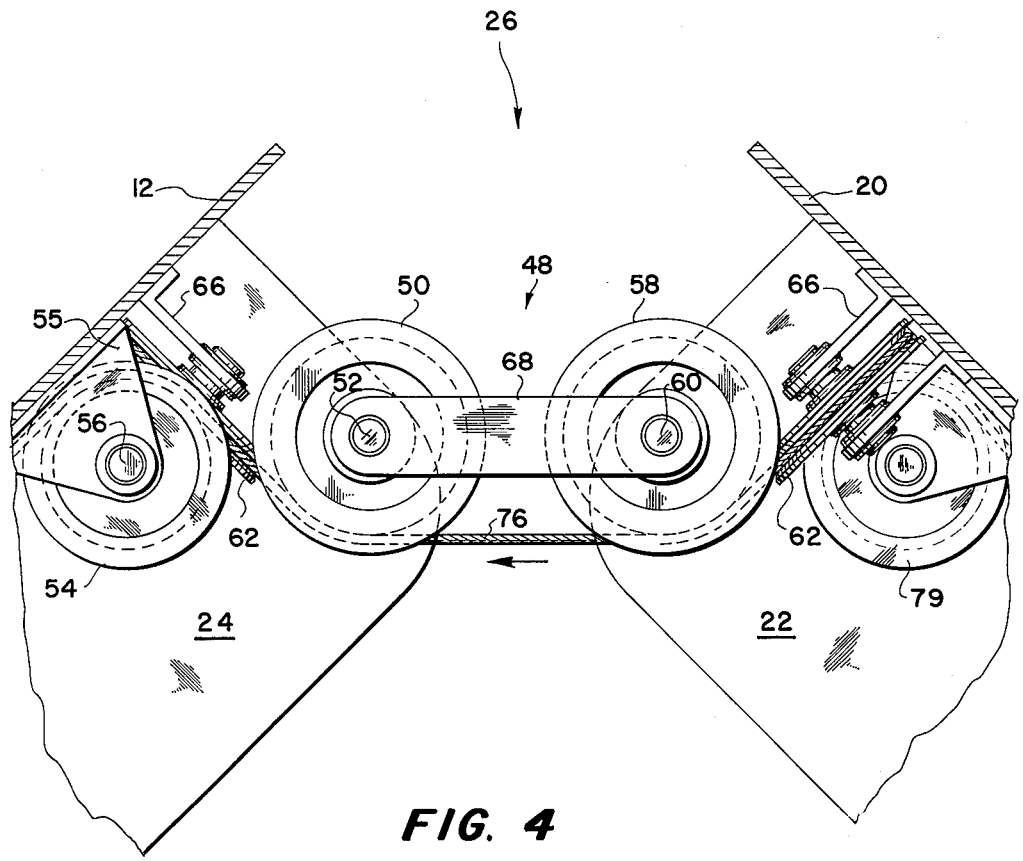
FIGURE 4 is an enlarged side elevational view partly in cross-section of the novel pulley and cable assembly illustrating two panels of the hatch cover arrangement in a partially collapsed position during the opening of the hatchway.

The amount of cable take-up can be readily computed by determining the circumference of each pulley and the arc through which the pulley travels upon rotation responsive to the pull of the cable. The length of the arc of pulley travel equals the amount of cable take-up for each pulley and in the instance of the pair of pulleys, disclosed in FIGURE 4, is equivalent to one-half of the circumference of a pulley. It is possible when operating on the above stated principle, that a single pair of pulleys be provided at each pivotal connection where the cable is dead ended at the idler pulley 94; however, in such an arrangement, the panels would require a large tensile force on the cable to accomplish the collapsing movement in the hatch opening operation. To decrease the required force on the cable, additional pairs of pulleys are provided (FIGURES 3 and 5) resulting in a distinct mechanical advantage. For example, two pairs of pulleys will reduce the required lifting force by one-half. Additional pairs of pulleys will further reduce the required tensile force on the cable by a proportional amount. Accordingly, the amount of cable take-up can be readily determined by properly computing the number of pulleys for a desired specific cable tension and adding the linear length of the 90° arc of travel by each pulley to give the total amount of cable take-up. It is important to note that in the collapsing and extending operations of the covers, each pair of pulleys will rotate a total of 180° from the completely extended position to the completely collapsed position.

The above calculations have been provided to exemplify the type of computation encountered by one skilled in the art, in determining the number of pairs of pulleys proportional to the weight of the hatch cover panels and the desired or available cable tension. It can be readily seen that the calculations are simple; therefore, facilitate prompt determination of the required structure for panels of various weights and available means for applying load to the cable.

A modification of the pulley and cable actuating apparatus is illustrated in FIGURES 14 through 18, wherein these figures disclose a panel 156 hinged to the ship's structure by the hinge connection 16 (FIGURE 16) and an adjacent panel 158 with the modified pulley and cable arrangement 159 being attached to these panels. (For purposes of brevity and simplicity in describing the novel features of the modification, it will be discussed in terms of a pair of opposed pulleys.) A pair of projections 160 and 162 (FIGURE 15) extend outwardly from panel 156 to which a bracket 164 is pivotally mounted supporting a pulley 166 rotatably fixed thereto. A similar arrangement is provided on the adjacent panel 158 wherein a pair of projections 168 and 170 (FIGURE 15) extend outward therefrom for supporting a bracket 172 on which a pulley 174 is rotatably mounted. Each of the pulleys 166 and 174 are mounted on the panels whereby their respective axes of rotation are disposed normal to the plane of the panels when the panels are in the extended condition. With respect to the adjacent panels 156 and 158 and their respective pulleys 166 and 174, the opposed pulleys are laterally spaced from one another to permit an actuating cable 176 to be threaded therearound in the manner shown in FIGURES 15 and 17, and also to permit the adjacent panels to come to rest in the substantially vertical position relatively close to one another without interference by engagement of the opposed pulleys 166 and 174. The arrangement of the pulleys between the adjacent panels in the disclosed modification utilizes the same principle of operation of the pulley arrangement disclosed in FIGURE 2; however, in this modification such an arrangement eliminates the need for additional idler pulleys 54 and 79 of FIGURE 2. The specific advantages of the modification will be more fully set forth in the operation of the hatch covers to be described hereinafter in detail.

Drag links 178 (FIGURES 15 and 16) are pivotally mounted at their end portions to suitable brackets 180 and 182 fixed to panels 156 and 158, respectively. The drag links 178 are located at the lateral ends of the panels and function as the connecting means between the adjacent panels operating in substantially the identical manner to the links 68 and 70 illustrated in FIGURE 2 of the drawing. Stabilizing bars 184 (FIGURES 15 and 16) are pivotally mounted on brackets 186 and 188 fixed to panels 156 and 158 respectively, with these stabilizing bars operating in the substantially identical manner to the stabilizing bars 113 illustrated in FIGURE 8 of the drawing. Spring assemblies 190 are pivotally mounted at end portions on the panels 156 and 158 by means of brackets 192 and 194 on panels 156 and 158, respectively. These spring assemblies operate in substantially the identical manner to the spring assemblies illustrated in FIGURE 10; however, in the arrangement shown in FIGURE 16 the coil spring 196 of the assembly is compressed during the collapsing of the adjacent panels to the hatchway opened condition and is in an unloaded condition when the panels are in the fully extended hatchway closed condition. The function of the spring assemblies 190 upon being compressively loaded is to provide the initial movement of the panels upon release of the actuating cable during the closing operation of the hatchway.

Figure 17:
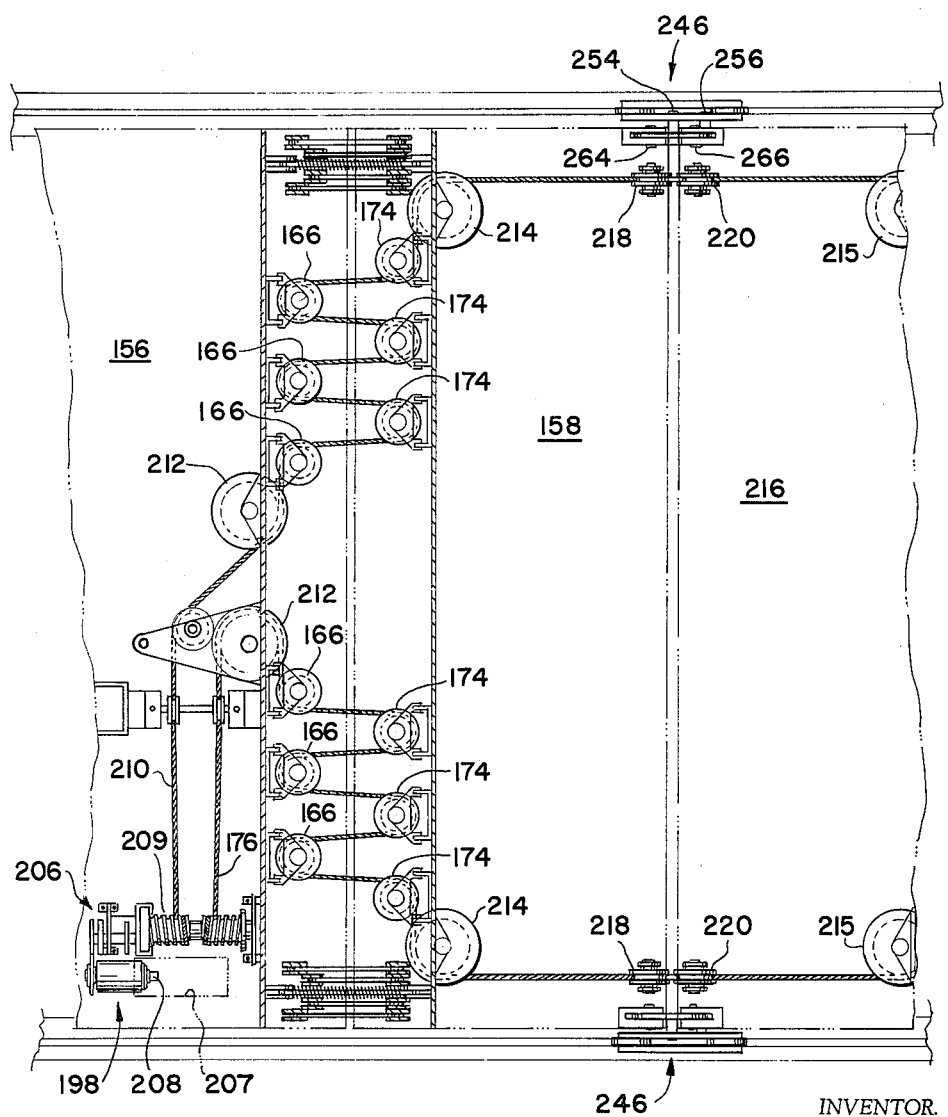
FIGURE 17 is a top view partly in cross-section of the novel hatch cover actuating apparatus shown in FIGURE 14 illustrating therein the structural location of the actuating apparatus disposed between adjacent panels of a pair of panels and the cable arrangement with respect to a third panel.

An electrically operated winch assembly 198 (FIGURE 16) is mounted by suitable brackets 200 to the under side of the deck portion 202 of the panel 156. The winch assembly comprises an electric motor 204 operable upon actuation to rotate a suitable reduction gearing arrangement 206 (FIGURE 17). A suitable switch (not disclosed) for operating the electric motor of the winch can be located in any desired position above or beneath the deck or on any of the panels of the assembly directly to actuate the winch. An access door 207 is provided in the panel 156 to facilitate panel actuation by means of an auxiliary shaft 208 extending from the electric motor 204 in case of power failure. Any suitable hand tool such as a pneumatic wrench or the like can be attached to the shaft 208 to turn the gearing arrangement 206 and, accordingly, operate the panel actuating apparatus. A drum 209 is mounted on the panel 156 and rotatably connected to the gearing arrangement (FIGURE 17). Cable 176 and another cable 210 are attached to the drum 209 in any suitable manner to enable wrapping of the cables therearound. In the embodiment of the invention shown in this modification, two cables are utilized and are threaded around laterally spaced banks of pulleys disposed intermediate the adjacent panels as illustrated in FIGURES 17; however, the arrangement of one cable and a bank of pulleys will suffice to actuate the panels to the open and closed hatchway condition and, accordingly, one cable and pulley arrangement will be described.

The cable 176 is threaded over a guide pulley 212 and the laterally spaced bank of sheaves 166 and 174 in the manner illustrated in FIGURE 17. A further guide pulley 214 is rotatably mounted on the adjacent panel 158, whereupon the cable is directed to a third panel 216 by means of guide pulleys 218 and 220 rotatably mounted on suitable brackets affixed to panels 158 and 216, respectively. From the guide pulley 220 the cable is again threaded about guide pulley 215 and then through a bank of pulleys (not shown) in substantially the identical manner as disclosed between panels 156 and 158. Because the threading operation of the cable between a third and fourth panel is substantially identical, the novel actuating apparatus is not disclosed in a four panel type of hatch cover arrangement. As previously indicated, for the sake of simplicity and brevity the pulley arrangement between a pair of adjacent panels is described in detail, whereupon one skilled in the art will readily see that the same basic pulley and cable arrangement can be utilized for any number of adjacent pairs of panels. In any event, the end of the cable 176 remote from the winch is dead-ended to one of the panels preferably the last panel in the hatch cover assembly; or, if jacking is desired, the cable end can be attached to the jacking mechanism of the type disclosed in FIGURE 13 of the drawing which will function in substantially the identical manner.

A safety mechanism 222 is provided (FIGURES 16 and 17) and comprises a shaft 224 on which a pair of pulleys 226 and 228 are mounted engagable with the cables 176 and 210, respectively. End portions 230 and 232 of the shaft 224 are positioned in guides formed by brackets 234 and 236 respectively mounted on the panel 156 and engage spring biasing means 238 and 240, respectively. The springs 238 and 240 operate to maintain engagement of the pulleys with the cables 176 and 210. A pair of limit switches 242 and 244 is mounted on the brackets 234 and 236 respectively for contact engagement with the ends 230 and 232 of the shaft 224. Tension in the cables 176 and 210 operates to direct the shaft ends 230 and 232 through the engagement of the cables with the pulleys into contact with the switches 242 and 244 respectively, compressing the springs 238 and 240 to a loaded condition. Similarly the reduction of tension in the cables 176 and 210 will permit the springs to bias the shaft ends 230 and 232 in an outward direction to break contact with the limit switches 242 and 244. The specific cooperation of the safety device with the over-all operation of the hatch cover arrangement will be described hereinafter when a typical operating cycle of the hatch cover system incorporating the modification is set forth.

A novel trucking arrangement is utilized in a multiple panel hatch cover assembly and is illustrated in FIGURE 18 wherein the truck assembly 246 comprises a frame 248 to which a pair of rollers 250 and 251 are rotatably mounted for engagement with a track 252 located on the hatch cover coaming 42 for movementt of the truck assembly therealong. Panel 158 is pivotally mounted on the truck frame 248 by means of a connecting pin 254, and panel 216 is pivotally mounted on the truck frame 248 by means of pin 256. A force transmitting link 258 is pivotally connected at its end portions to projecting portions 260 and 262 extending outwardly from panels 158 and 216 by means of pins 264 and 266 respectively. The specific geometry in the location of the force transmitting link 258 with respect to the pivotal connections 254 and 256 between panels 158 and 216 and the truck frame 248 is such as to form a four bar linkage arrangement, whereupon pivotal movement of the panel 158 will impart a downward force in the link 258 to create a moment about the hinge connection 256 of panel 216. It can be readily seen from this four bar linkage arrangement that the force transmitting link 258 will provide, by the proper geometrical location of the link with respect to the pivotal points of the panels on the truck frame, the actuating means for the panel 216. Accordingly, the use of a pulley arrangement of the type disclosed in FIGURE 6 is not absolutely necessary. This arrangment, however, may be undesirable due to limitations in available space beneath the panels in the ship's hold and the specific length of the moment arm required to lift the weight of the required panel. The novel trucking arrangement is utilized between the second and third panel of a three panel hatch cover arrangement or between the second and third panel of a four panel arrangement; and accordingly, additional odd and even numbered panels can be added utilizing this trucking arrangement between adjacent pairs of panels; or as above set forth, between a pair of panels and the odd panel in an odd numbered arrangement. Naturally, the desired panel arrangement is predicated by the specific hatchway opening to be covered.

Figure 2:
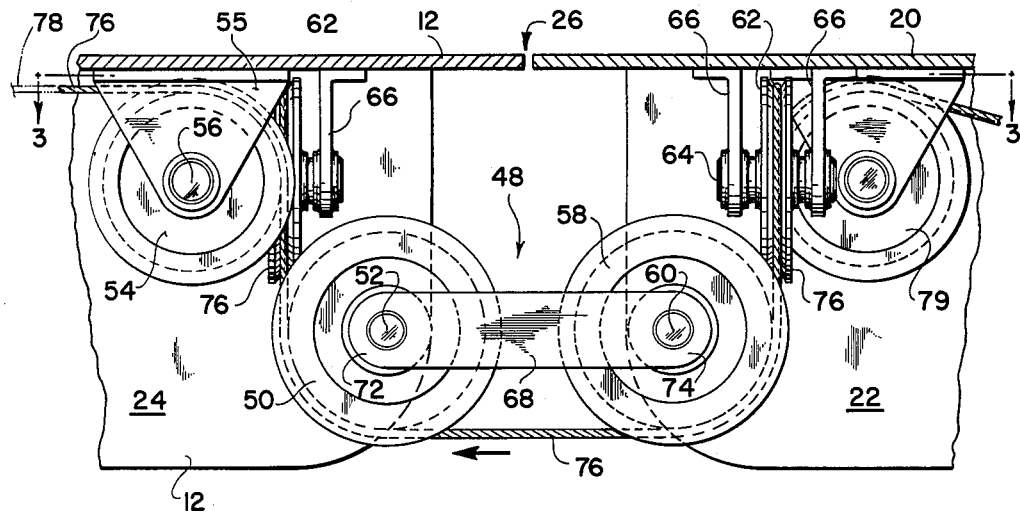
FIGURE 2 is an enlarged side elevational view partly in cross-section of the hatch cover actuating apparatus illustrating the novel pulley and cable assembly at a pivotal connection between two panels of the hatch cover arrangement.

The operation of the modified pulley and cable arrangement for providing a hatchway opened condition is as follows. Actuation of the on-off switch in turn will activate the electric motor 204 causing the drum 209 to wrap the cables 176 and 210 therearound. Since the operation of the pulley and cable arrangement is identical for each set of pulleys and cable, the specific cooperation of cable 176 with the sheaves 166 and 174 will be described hereinafter for purposes of brevity. Continued rotation of the drum increases the tension on the cable 176 since one end of the cable is dead-ended in a suitable manner to the last panel of the set of panels to be actuated or attached to suitable jacking means of the type disclosed in FIGURE 13, which is designed to raise the panels prior to any collapsing movement of the panels from the coaming to break the seal therebetween. Increased tension in the cable creates a force between the sheaves 164 and 174 and in turn the brackets 160 and 162 of panel 156 and brackets 168 and 170 of panel 158 tending to move the panels in a direction toward one another. The tension force between the opposed pulley sheaves is reacted to by the drag links 178 which function to maintain the adjacent edges of the panels 156 and 158 in a predetermined spaced relationship. Since the drag links 178 are pivotally connected to the panels, each panel will tend to pivot about the pivotal connection with the drag link as a result of the moment of force created by the tension in the cable created about the hinge point of the adjacent panels 156 and 158. The hinge point of the panels of the embodiment shown in FIGURE 2 is established by the intersecting planes formed by the drag links 68 and the stabilizing bar 113. Similarly then, the hinge point between panels 156 and 158 is established at the point of interesection between the plane of the drag links 178 and the stabilizing bar 184. The moment arm, it can be readily seen, is the distance from the hinge point to the cable and the value of the moment developed by the cable tension can be expressed by the tension in the cables times the moment arm. It can be further readily seen that in a multiple pulley arrangement as disclosed in FIGURE 17, the amount of tension in each section of cable interconnecting the opposed sheaves 164 and 174 is equal, and multiplying the number of sections of cable, times the tesion in the cable, times the moment arm, will provide the amount of force acting on the adjacent panels tending to collapse the panels to the substantially vertical position providing the hatchway opened condition. The pivotal mounting of the pulleys 166 and 174 in the manner disclosed in FIGURES 14 through 17 is such as to provide a maximum amount of cable beneath the hinge point of the panels to provide the greatest force acting on the moment arm. By increasing the number of opposed pulleys, the resultant moment will be proportional to the increase in the number of cable sections between the panels and, in turn, the number of pulleys. For adjacent pairs of panels the identical calculations can be made to determine the amount of torque created about the hinge point between the adjacent panels in each pair of panels, and a determination of the entire amount of force actuating the panels can be readily computed. The pivoting of the opposed pulleys 166 and 174 permits the maximum amount of force established by the tension in the cable to remain substantially normal to the moment arm and thus provides the desired force from the initial movement of the panels when in the extended position through to the substantially vertical position of the panels in the hatchway opened condition. During the panel collapsing operation the lifting of the panel 158 (FIGURE 18) will transmit force through the link 258 which will, in turn, create a moment around the pivot point 256 of panel 216 thereby causing panel 216 to pivot about the connection 256. In instances where pairs of panels are utilized, the force transmitting link 258 acts as an aid to the pulley and cable arrangement between adjacent panels of each pair of panels during the panel collapsing operation.

When it is desired to close the hatchway, the direction of rotation of the drum 209 is reversed resulting in the paying out of cable as threaded through the opposed pulley arrangement. The springs 196 being compressed by the folding operation will be released by the paying out of cable and, in turn, create a moment about the hinge point between the adjacent panels 156 and 158 tending to move the truck in the direction which will result in the extending of the panels to the hatchway closed condition. Continued paying out of the cable and gravity will enable the panels to obtain the desired extended position. The force transmitting link 258, accordingly, will restrict the closing of the third panel 216 in a three panel arrangement to the extent of the movement of panel 158.

From the disclosed pulley and cable arrangement, including the four bar linkage truck assembly, a variety of types of actuating apparatus can be readily installed in any odd or even numbered hatch cover assembly. For example, in a single panel arrangement the cable and pulley assembly disclosed in FIGURE 6 can be utilized. In a two panel arrangement the actuating apparatus disclosed in FIGURE 2 or in FIGURE 14 can be utilized. In a three panel hatch cover arrangement the cable and pulley arrangement between the first and second panels can be of the type disclosed in either FIGURE 2 or FIGURE 14, with the third panel actuation being accomplished by the pulley and cable arrangement disclosed in FIGURE 6, or the four bar linkage arrangement disclosed in FIGURE 18. Accordingly, any panel actuating arrangement of odd or even numbered panels can be accomplished by utilizing the pulley and cable and trucking arrangement disclosed herein.

With respect to the operation of the safety device, upon closing of the hatchway wherein the panels are in the substantially vertical condition, paying out of the cable can be accomplished at a predetermined rate to maintain a specified tension in the cable. When one of the rollers of the trucking arrangement, for example, engages an obstruction on the track in the path of movement of the truck, or suitable safety hooking means (not shown) connecting the panels when in the folded position to prevent accidental extending movement thereof is not released and the winch continues to pay out cable, the tension therein will be substantially reduced releasing the loading imparted to the biasing springs 238 and 240 by the pulleys 226 and 228 and the shaft 224 arrangement. The biasing springs, accordingly, will react by moving the shaft in a direction away from the limit switches 242 and 244 thereby opening the circuit to which these switches are connected. The circuit controlling the electric motor 204 of the winch mechanism is the same circuit to which the switches 242 and 244 are connected, whereby movement of the shaft 224 will result in the opening of the circuit also providing the electrical signal to the electric motor whereupon further paying out of the cable will be stopped. In this instance the obstruction to movement of the panels can be removed, whereupon slight movement of the panels with the aid of the spring assemblies 196 and gravity will accordingly increase tension in the cable causing the cable to move the pulleys and in turn the shaft to engage the switches to close the circuit facilitating operation of the electric motor. Thereafter continued paying out of the cable will enable the panels to reach the fully extended, hatchway closed condition.

From the foregoing description it can be readily seen that the objectives of the instant invention are readily met by the structure disclosed herein, and various combinations of pulley and cable arrangement can be devised best suited for the needs of the particular vessel or vehicle in which a hatchway is to be opened and closed responsive to the control of a single operator.

While the invention has been described, disclosed, illustrated and shown in terms of the preferred embodiment or modification which it has assumed in practice, the scope of the invention should not be deemed to be limited by the precise embodiment or modification as herein described, disclosed, illustrated and shown, since other embodiments and modifications are intended to be reserved where they fall within the scope of the claims herein appended.

I therefore claim as my invention:

1. In combination with a pair of relatively movable panel sections and the like, a truck assembly comprising a body, anti-friction means for movably supporting the truck assembly, means for pivotally connecting each of said sections to the truck body for swinging movement with respect thereto, and panel-connecting means extending between and interconnecting the panel sections independently of the connections thereof to the truck body, said panel-connecting means being operative to transmit force from one section to the other in such manner that swinging movement of one relative to the truck body causes the other to swing on its pivotal connection to the body.

2. The combination set forth in claim 1 wherein the pivotal connections of the sections to the truck body are spaced apart, and the panel connecting means is a force-transmitting link having its ends pivoted respectively on the panel sections, with said link and the spaced pivotal connections of the sections being arranged to form a four-bar linkage actuating mechanism between the sections.

3. The combination set forth in claim 2 wherein said anti-friction means comprises rollers, and said rollers are engaged with track means for movement of the truck assembly therealong.

4. The combination set forth in claim 3 wherein one of the panel sections is driven by power means for its swinging movement relative to the truck assembly, and the force of such powered movement is transmitted through said actuating mechanism to the other section.

5. In a cover system for ship hatchways and the like, first and second adjacent structural sections supported for relative movement between a substantially horizontal extended condition and a folded substantially vertical condition for closing and opening the hatchway and the like, connecting means interconnecting said first and second sections at adjacent ends thereof for said relative movement, pulleys respectively associated with said sections at said adjacent ends thereof, mounting means for supporting said pulleys on said sections in substantially horizontal disposition, with said mounting means permitting movement of the pulleys relative to the sections to maintain the pulleys in such substantially horizontal disposition in all conditions of relative movement of the sections between and including said extended and folded positions of the sections, and actuating means operative between said sections and cooperable with said pulleys to provide said relative movement of the sections.

6. A cover system as set forth in claim 5 wherein the pulleys are pivotally mounted on the sections.

7. A cover system as set forth in claim 5 wherein each section is provided with a series of said pulleys and the pulleys of one series are laterally offset with respect to the pulleys of the other series, so that the sections can be brought together in the folded condition without interference between the two series of pulleys, and the actuating means is a continuous cable trained alternately about the pulleys of the two series.

8. A cover system as set forth in claim 5 wherein a further structural section is connected to one of said first and second sections by roller truck means to which the thus interconnected sections are pivotally attached, and a force transmitting link extends between the further structural section and said one section to produce actuation of the further structural section in response to relative movement of said first and second sections.

9. A cover system as set forth in claim 5 wherein the actuating means is connected to a power source mounted on one of said sections.

10. A cover system as set forth in claim 9 wherein the power source comprises an electrically driven winch.

11. A cover system as set forth in claim 10 wherein said winch is controlled by a safety device to interrupt the operation thereof in the event of excessive resistance to the relative movement of the sections.

12. A cover system for ship hatchways and the like, first and second adjacent structural sections supported for relative movement between a substantially horizontal extended condition and a folded substantially vertical condition respectively for closing and opening the hatchway and the like, a further structural section disposed adjacent an outer edge of said second section for relative movement with said second structural section, connecting means interconnecting said adjacent structural sections, said connecting means including truck means interconnecting said second section with said further structural section, pulleys respectively associated with said first and second sections at their adjacent ends and below the top surface of the panels, and actuating means operative between said sections and cooperative with said pulleys to provide upon actuation said relative movement of said first and second sections, said second structural section and said further structural section being pivotally connected to said truck means, with said truck means operative to transmit force from said second structural section to said further structural section upon actuation of said first and second structural sections.

References Cited by the Examiner

UNITED STATES PATENTS

| 2,664,947 | 1/1954 | Aarnold | 114—201 X |
| 2,949,091 | 8/1960 | Lovell | 160—188 X |
| 2,980,921 | 4/1961 | Bartolucci | 114—202 X |
| 3,090,429 | 5/1963 | Kummerman | 160—188 |

FOREIGN PATENTS

| 1,055,573 | 10/1953 | France. |
| 168,626 | 9/1959 | Sweden. |

HARRISON R. MOSELEY, *Primary Examiner.*

REINALDO P. MACHADO, *Examiner.*